(12) United States Patent
Nishikawa

(10) Patent No.: US 7,596,003 B2
(45) Date of Patent: Sep. 29, 2009

(54) ELECTRIC POWER CONVERTER

(75) Inventor: Yukihiro Nishikawa, Hino (JP)

(73) Assignee: Fuji Device Technology Co., Ltd., Tokyo (JP)

( * ) Notice: Subject to any disclaimer, the term of this patent is extended or adjusted under 35 U.S.C. 154(b) by 0 days.

(21) Appl. No.: 11/448,118

(22) Filed: Jun. 7, 2006

(65) Prior Publication Data
US 2007/0047267 A1    Mar. 1, 2007

(30) Foreign Application Priority Data
Sep. 1, 2005    (JP)    ............................. 2005-253564

(51) Int. Cl.
*H02M 3/335*    (2006.01)
*H02M 5/42*    (2006.01)
(52) U.S. Cl. ...................... 363/21.04; 363/89
(58) Field of Classification Search ................. 323/222, 323/266, 282; 363/16, 17, 20, 21, 21.01, 363/21.12, 21.16, 89, 93, 97
See application file for complete search history.

(56) References Cited

U.S. PATENT DOCUMENTS

| | | | |
|---|---|---|---|
| 3,596,165 A | * | 7/1971 | Andrews ..................... 363/19 |
| 6,469,913 B2 | | 10/2002 | Hosotani et al. |
| 6,631,082 B2 | * | 10/2003 | Birumachi ................... 363/97 |
| 6,687,137 B1 | * | 2/2004 | Yasumura ................. 363/21.01 |
| 6,738,266 B2 | * | 5/2004 | Hosotani et al. .............. 363/16 |
| 6,917,528 B2 | | 7/2005 | Abe |
| 7,113,411 B2 | * | 9/2006 | Hosotani et al. .............. 363/16 |
| 2002/0080634 A1 | * | 6/2002 | Nozawa et al. ................ 363/97 |

FOREIGN PATENT DOCUMENTS

| | | |
|---|---|---|
| JP | 2002-112544 | 4/2002 |
| JP | 2004-153948 | 5/2004 |

* cited by examiner

*Primary Examiner*—Akm E Ullah
*Assistant Examiner*—M'Baye Diao
(74) *Attorney, Agent, or Firm*—Rabin & Berdo, P.C.

(57) ABSTRACT

A control circuit for controlling a subsidiary (high-side) switching device in an insulating electric power converter having a half-bridge structure includes a first series circuit of a resistor and a diode, a second series circuit of a resistor and a diode, and a transistor. The control circuit turns the subsidiary switching device ON and OFF using the voltage generated in a transformer winding for a signal voltage. The control circuit also turns the transistor ON and OFF with the voltages generated in the first and second series circuits so as not to make the gate voltage of subsidiary switching device exceed the gate breakdown voltage thereof in all the operation modes.

3 Claims, 7 Drawing Sheets

ELECTRIC POWER CONVERTER

FIELD OF THE INVENTION

The invention relates to an electric power converter such as a switching power supply that outputs a DC output insulated from a DC power supply.

BACKGROUND OF THE INVENTION

FIG. 6 is a block circuit diagram of a conventional electric power converter. The conventional electric power converter has a circuit configuration similar to that of the switching power supply disclosed in Unexamined Japanese Patent Application 2004-153948, equivalent to U.S. Pat. No. 6,917,528 B2. In the circuit shown in FIG. 6, a main switching device 1 and a subsidiary switching device 2 repeat switching ON and OFF alternately such that the excitation energy stored in a transformer 6 while main switching device 1 is turned ON is fed to a load as a DC output while main switching device 1 is turned OFF.

Now the operations of the circuit shown in FIG. 6 will be described with reference to FIG. 7. FIG. 7 is a wave chart describing the operations of the circuit shown in FIG. 6. In the following descriptions, the main and subsidiary switching devices are metal oxide semiconductor field-effect transistors (MOSFETs).

Referring now to FIG. 7, the voltage between the gate and source (hereinafter referred to as the "gate-source voltage") VGS1, the voltage between the drain and source (hereinafter referred to as the "drain-source voltage") VDS1 and the drain current ID1 of main switching device 1 shown in FIG. 6 are described. Also described in FIG. 7 are the gate-source voltage VGS2, the drain-source voltage VDS2 and the drain current ID2 of subsidiary switching device 2 shown in FIG. 6. The current IDr of a diode 8 in FIG. 6 is described in FIG. 7. As described in FIG. 7, the operations of the circuit shown in FIG. 6 may be considered in time periods from time t1 to time t6.

State 1: t1 to t2

As the gate-source voltage VGS1 of main switching device 1 exceeds a gate threshold voltage VGS(th) to the higher side in the state, in which the gate input capacitance of main switching device 1 is charged up via a resistor 18 by the voltage generated in the third winding 6f of transformer 6 and the body diode in main switching device 1 is electrically conductive such that the drain-source voltage VDS1 is 0, main switching device 1 performs zero-voltage turn-ON in the state, in which a current is flowing through the body diode thereof. The drain current ID1 of main switching device 1 is equal to the exciting current of transformer 6 and increases linearly. Since the gate-source voltage VGS2 of subsidiary switching device 2 is negative due to the voltage generated in the fourth winding 6b of transformer 6, subsidiary switching device 2 is OFF.

State 2: t2 to t3

As the voltage generated across a resistor 17 by the drain current ID1 of main switching device 1 exceeds the voltage between the base and emitter of a transistor 21, transistor 21 turns ON. Since the gate input capacitance of main switching device 1 is discharged, main switching device 1 turns OFF, the drain-source voltage VDS1 of main switching device 1 rises and the drain-source voltage VDS2 of subsidiary switching device 2 lowers.

State 3: t3 to t4

Diode 8 becomes electrically conductive and the excitation energy stored in transformer 6 is fed to the secondary side thereof. Subsequently, the voltage across transformer fourth winding 6b rises and shifts from negative to positive.

State 4: t4 to t40

As the voltage across transformer winding 6b exceeds the gate threshold voltage VGS(th) of subsidiary switching device 2 to the higher side, subsidiary switching device 2 performs zero-voltage turn-ON in the state, in which a current is flowing through the body diode thereof.

State 5: t40 to t5

As all the excitation energy stored in transformer 6 is discharged, diode 8 becomes OFF and the voltage across transformer fourth winding 6b starts lowering.

State 6: t5 to t6

As the voltage across transformer fourth winding 6b falls below the gate threshold voltage VGS(th) of subsidiary switching device 2, subsidiary switching device 2 turns OFF. The drain-source voltage VDS2 of subsidiary switching device 2 rises and the drain-source voltage VDS1 of main switching device 1 lowers.

State 7: from t6

The drain-source voltage VDS1 of main switching device 1 is set at zero and the drain-source voltage VDS2 of subsidiary switching device 2 at the voltage of a DC power supply 3.

The subsequent operations return to those in the State 1 and repeat self-oscillations repeating the States 1 through 6.

Since the main and subsidiary switching devices in the circuit shown in FIG. 6 perform zero-voltage turn-ON, turn-on losses are not caused. Since the magnetic energies stored in the leakage inductances of transformer 6 and reactor 5 are regenerated to the DC power supply or the transformer secondary side, an electric power converter that causes low losses and exhibits a high conversion efficiency is obtained.

Although any control circuit is not disposed for the subsidiary switching device in FIG. 6, an electric power converter including a control circuit, which includes a transistor and a delay circuit, for controlling the subsidiary switching device is described in Unexamined Japanese Patent Application 2002-112544, equivalent to U.S. Pat. No. 6,469,913 B2

It is necessary to design the circuit, which drives a subsidiary switching device with the auxiliary winding (fourth winding 6b) of a transformer as described above, so that the voltage applied between the gate and source of the subsidiary switching device may not exceed the gate breakdown voltage. If the subsidiary switching device is a MOSFET, the gate breakdown voltage will usually be around ±30 V.

Immediately after main switching device 1 starts switching by DC power supply 3, the voltage across a capacitor 4 is zero. Therefore, the maximum value VGSmax of the gate-source voltage of subsidiary switching device 2 is given by the following formula (I).

$$VGSmax = (\text{Voltage of DC power supply 3}) \times (\text{Number of turns in fourth winding } 6b) \div (\text{Number of turns in primary winding } 6a) \quad (1)$$

Depending on the ON-duty of main switching device 1, the voltage described by the formula (1) may be applied between the gate and source of subsidiary switching device 2.

For example, when DC power supply 3 is obtained by rectifying the commercial AC power supply, the commercial AC power supply voltage is different from country to country. Therefore, if one wants to obtain a switching power supply employable in all the countries, the range of the voltage across DC power supply 3 will be inevitably wide. As the foregoing formula (1) clearly indicates, it is very difficult to design such that the maximum gate-source voltage VGSmax never exceeds the gate breakdown voltage over the entire voltage range of DC power supply 3.

For obviating the problem described above, a Zener diode may be connected between the gate and source of subsidiary switching device 2 to clamp the gate-source voltage of subsidiary switching device 2 with the Zener voltage and a Zener current may be made to flow via a resistor 16 connected to the gate terminal of subsidiary switching device 2, when the gate-source voltage of subsidiary switching device 2 is clamped. However, since subsidiary switching device 2 causes more switching losses as the resistance value of resistor 16 is higher, the resistance value of resistor 16 is set usually at several tens to several hundreds ohm. Therefore, a high Zener current is caused when the gate-source voltage is clamped, further causing a low conversion efficiency.

In view of the foregoing, it would be desirable to provide an electric power converter that facilitates controlling the control terminal voltage (gate voltage) of a subsidiary switching device to be lower than the gate breakdown voltage in a wide DC input voltage range or in various operation modes, reducing the losses thereof and obtaining a high conversion efficiency.

SUMMARY OF THE INVENTION

According to one embodiment of the invention, there is provided an electric power converter including:

a DC power supply;

a series circuit including a main switching device and a subsidiary switching device, the series circuit being connected between the positive and negative terminals of the DC power supply;

an insulating transformer including a first winding on the primary side thereof and a second winding on the secondary side thereof, the first winding being connected between the positive terminal of the DC power supply and the connection point of the main and subsidiary switching devices via a series circuit including a capacitor and an inductor, the second winding being connected to a load via a rectifying and smoothing circuit;

a main control circuit turning ON and OFF the main switching device;

a subsidiary control circuit turning ON and OFF the subsidiary switching device;

the main and subsidiary control circuits turning ON and OFF the main and subsidiary switching devices alternately to convert the voltage generated in the second winding to DC electric power through the rectifying and smoothing circuit and to feed the converted DC electric power to the load;

the insulating transformer further including a third winding and a fourth winding in the primary side thereof;

the main control circuit turning ON and OFF the main switching device using the voltage of the third winding for a signal voltage to adjust the DC voltage fed to the load at a certain value;

the main control circuit using the voltage obtained by rectifying and smoothing the voltage generated in the third winding for a control power supply;

the subsidiary control circuit turning ON and OFF the subsidiary switching device using the voltage generated in the fourth winding for a signal voltage, and the subsidiary control circuit controlling the control terminal voltage of the subsidiary switching device.

According to another embodiment of the invention, the subsidiary control circuit includes a first series circuit including a first diode and a first resistor, a second series circuit including a second diode and a second resistor, and a first transistor; the subsidiary control circuit turns ON and OFF the subsidiary switching device using the voltage generated in the fourth winding for a signal voltage; and the first transistor controls the control terminal voltage of the subsidiary switching device based on the signal voltages generated in the first and second series circuits.

According to yet another embodiment of the invention, the subsidiary control circuit includes a second transistor; the subsidiary control circuit turns ON and OFF the subsidiary switching device using the voltage generated in the fourth winding for a signal voltage; and the second transistor is controlled to prevent the control terminal voltage of the subsidiary switching device from exceeding a predetermined value.

According to still another embodiment of the invention, the subsidiary control circuit includes a third series circuit including a third diode and a third resistor, a fourth series circuit including a fourth diode and a fourth resistor, a third transistor, and a fourth transistor; the subsidiary control circuit turns ON and OFF the subsidiary switching device using the voltage generated in the fourth winding for a signal voltage; the third transistor controls the control terminal voltage of the subsidiary switching device based on the signal voltages generated in the third and fourth series circuits; and the fourth transistor is controlled based on the signal voltages generated in the third and fourth series circuits to prevent the control terminal voltage of the subsidiary switching device from exceeding a predetermined value.

By controlling the control terminal (gate terminal) voltage of the subsidiary switching device, the voltage applied to the subsidiary switching device never exceeds the gate breakdown voltage thereof according to the invention irrespective of the entire DC power supply voltage range and the operations of the subsidiary switching device and the electric power consumed by controlling the control terminal voltage of the subsidiary switching device is small. Therefore, the electric power converter according to the invention facilitates reducing the losses caused therein and exhibiting a high conversion efficiency.

The present invention will further become apparent from the detailed description given hereinafter. However, it should be understood that the detailed description and specific examples, while indicating preferred embodiments of the invention, are given as illustrations only, and various changes and modifications within the spirit and scope of the invention are permitted and will become apparent to those skilled in the art from this detailed description.

DETAILED DESCRIPTION OF THE PREFERRED EMBODIMENTS

Now the invention will be described in detail hereinafter with reference to the accompanied drawings, which illustrate the preferred embodiments of the invention.

Figure 1:
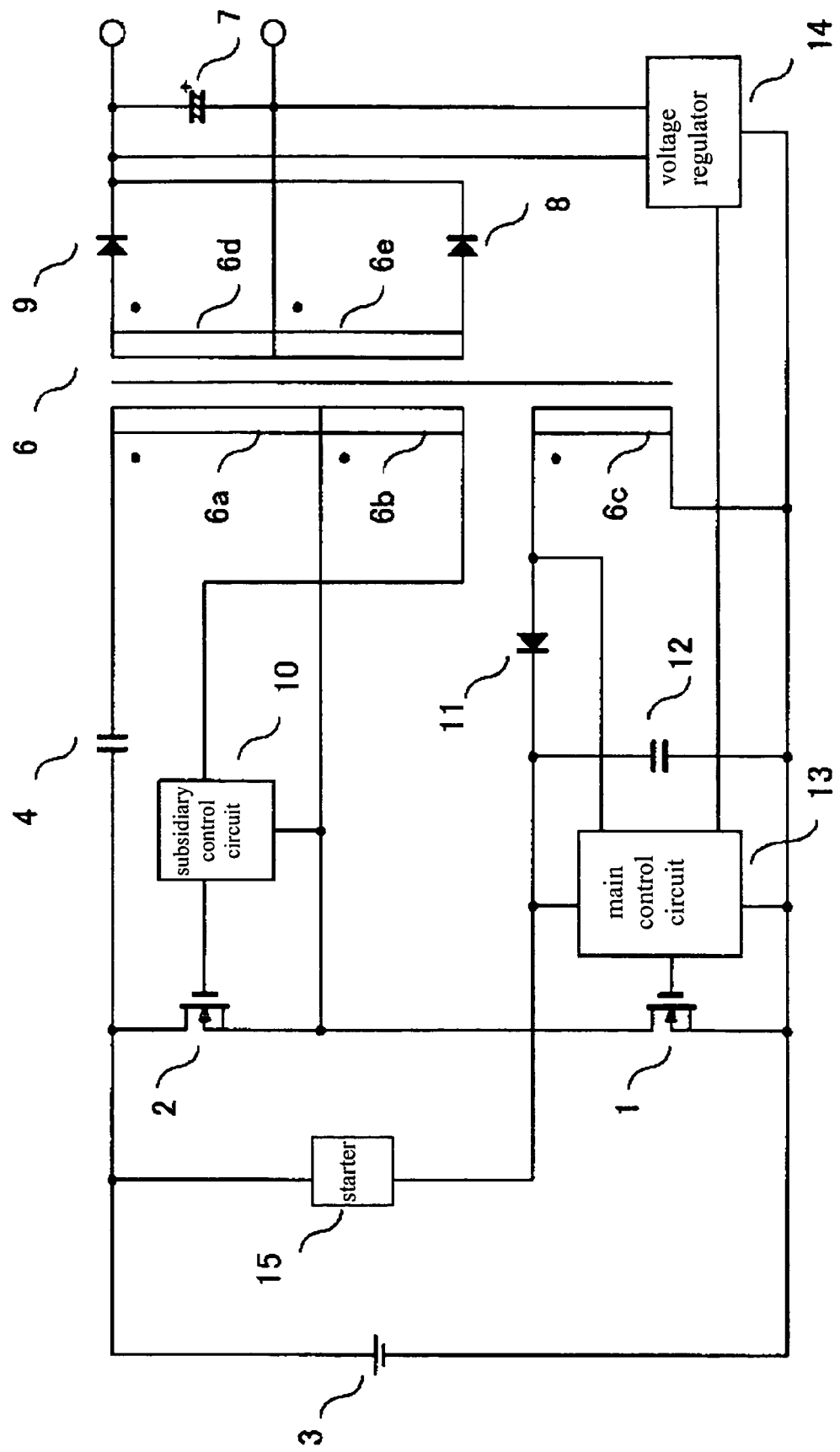
FIG. 1 is a block circuit diagram of an electric power converter according to a first embodiment of the invention.
Figure 6:
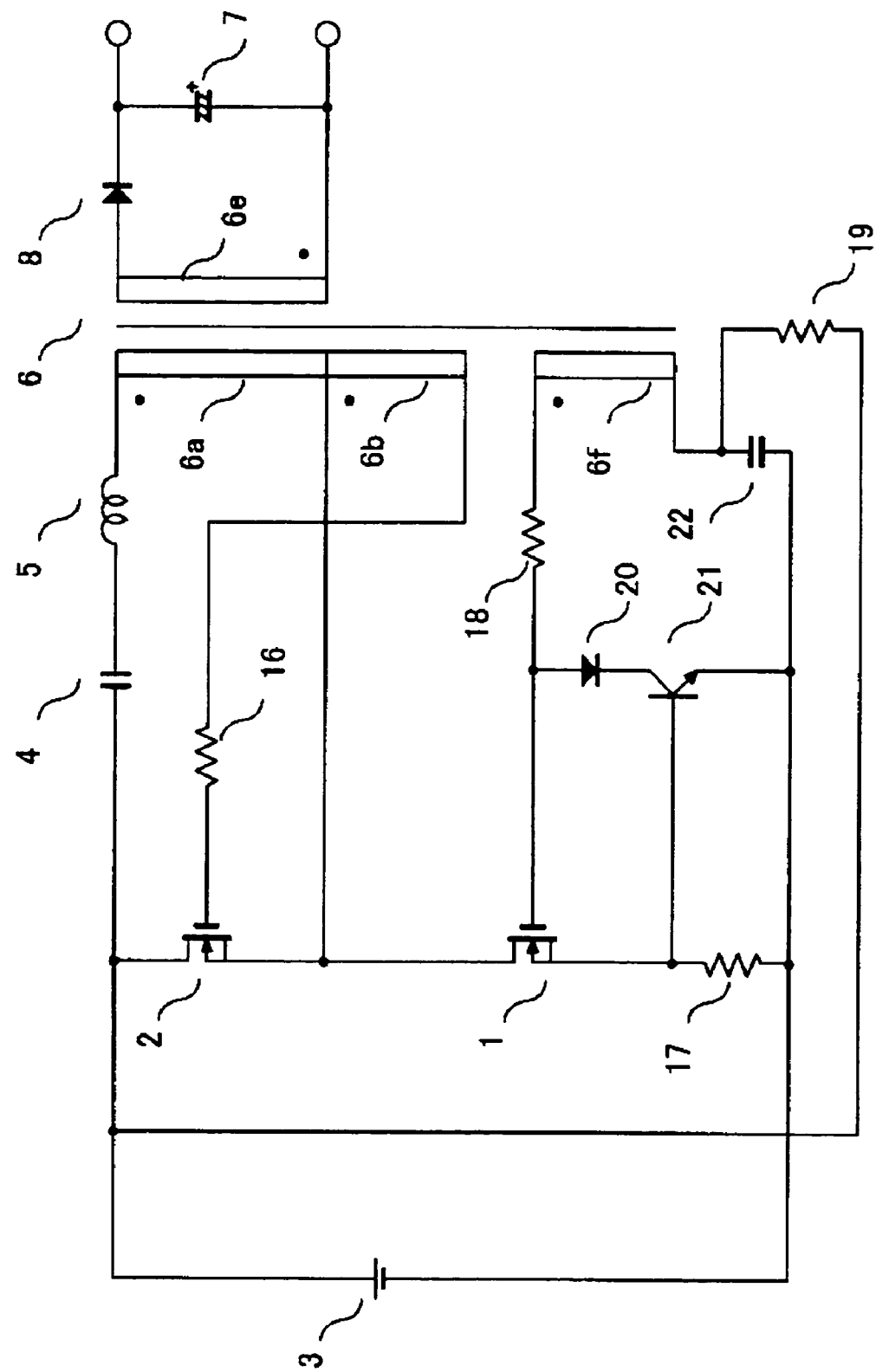
FIG. 6 is a block circuit diagram of a conventional electric power converter.
Figure 7:
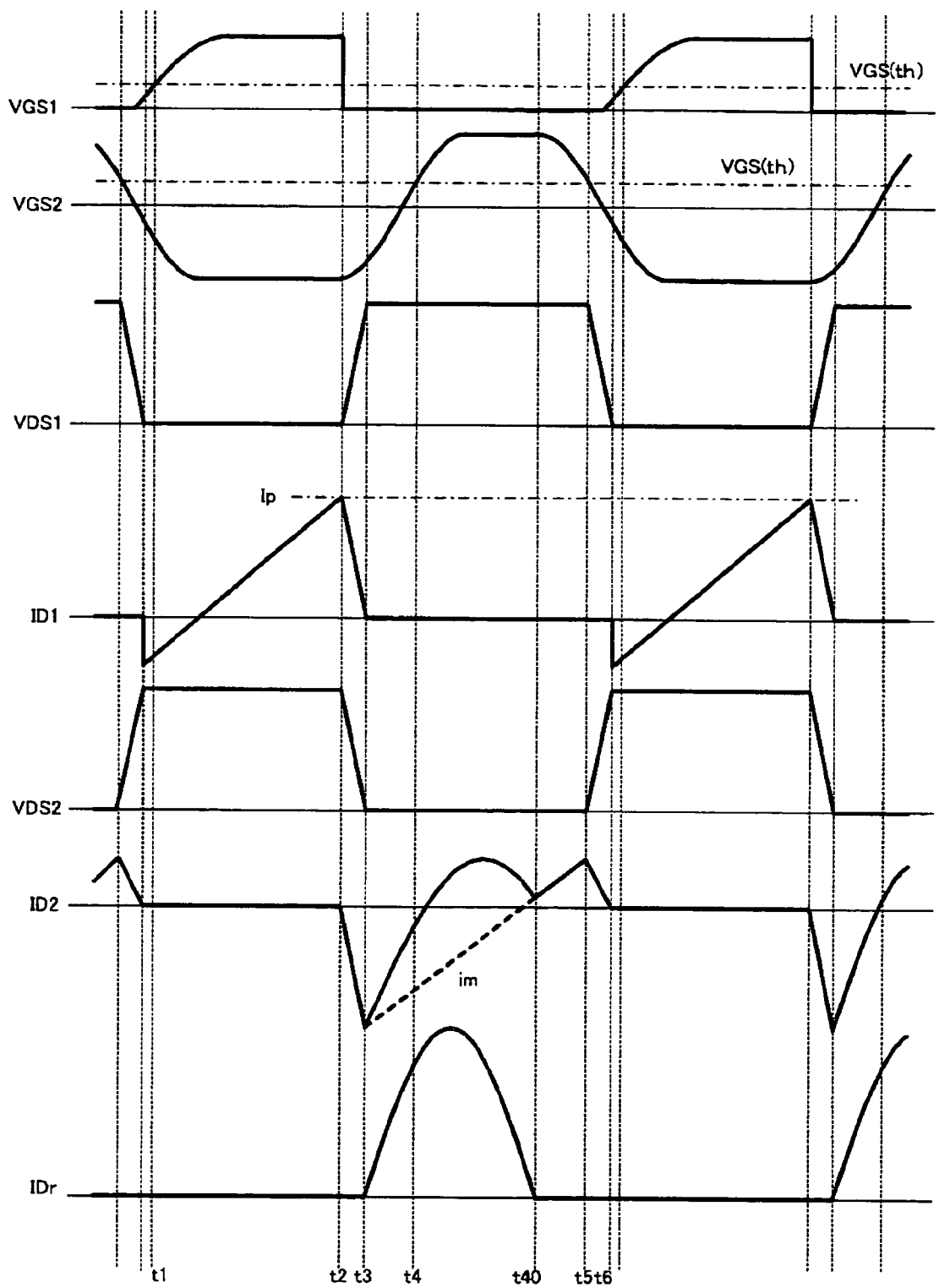
FIG. 7 is a wave chart describing the operations of the conventional electric power converter shown in FIG. 6.

FIG. 1 is a block circuit diagram of an electric power converter according to a first embodiment of the invention. The electric power converter shown in FIG. 1 is characterized in that a subsidiary control circuit 10, a main control circuit 13, a voltage regulator circuit 14 and a starter circuit 15 are added to the conventional electric power converter shown in FIG. 6. Therefore, the constituent elements that are the same as those shown in FIG. 6 will not be described again but the constituent elements that are different from those shown in FIG. 6 will be mainly described below.

Starter circuit 15 initially charges up a capacitor 12 that feeds a control power supply to main control circuit 13. Starter circuit 15 is formed of resistors or a switching circuit.

As capacitor 12 is charged up such that the voltage thereof is high enough to make main control circuit 13 work, main control circuit 13 feeds a start pulse to main switching device 1 to make main switching device 1 start turning ON and OFF. After main switching device 1 is started, main control circuit 13 turns main switching device 1 ON at the timing, at which the voltage generated in the third winding 6c of transformer 6 shifts from negative to positive. Main control circuit 13 turns main switching device 1 OFF based on the feedback signal outputted from voltage regulator circuit 14 so that the voltage, fed to a load connected to both ends of a secondary side capacitor 7, may be constant. Alternatively, main control circuit 13 turns main switching device 1 OFF at the time determined by the maximum ON-pulse width set in main control circuit 13 or at the timing, at which the voltage of third winding 6c shifts from positive to negative. Here, the voltage polarity in each winding of transformer 6 is defined such that the voltage generated toward the dot designating the starting point of the winding turns is positive. The voltage obtained by rectifying and smoothing the voltage generated in third winding 6c with a diode 11 and capacitor 12 is fed to main control circuit 13 as a control power supply.

As main switching device 1 turns OFF, the voltage of winding 6b shifts from negative to positive. Subsidiary control circuit 10 turns subsidiary switching device 2 ON and OFF using the voltage of winding 6b as a signal to turn main and subsidiary switching devices 1 and 2 ON and OFF alternately. Consequently, positive and negative voltages are generated alternately in each winding of transformer 6. The voltage of the secondary winding having a center tap structure is full-wave rectified with diodes 8, 9 and capacitor 7 and the full-wave rectified voltage is fed to a load. Alternatively, the secondary winding voltage may be half-wave rectified to obtain the voltage supply to the load. The leakage inductance of transformer 6 may be used in substitution for reactor 5 of FIG. 6. Since the leakage inductance of transformer 6 is used in substitution for reactor 5 in FIG. 1, reactor 5 is omitted.

Figure 2:
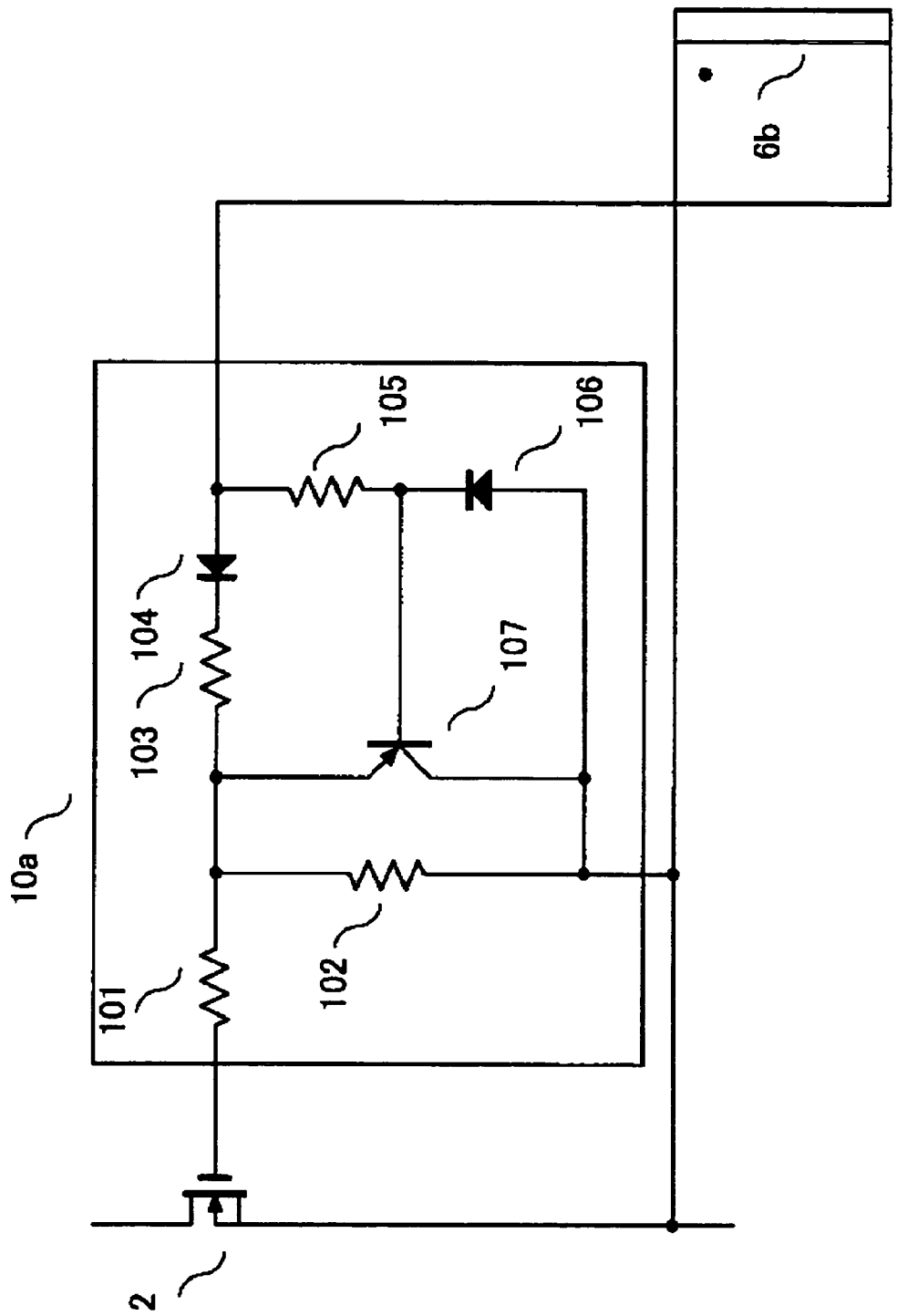
FIG. 2 is a typical example of the subsidiary control circuit in FIG. 1.

FIG. 2 shows a typical example 10a of subsidiary control circuit 10 in FIG. 1. (Hereinafter, typical example 10a of subsidiary control circuit 10 will be referred to simply as "subsidiary control circuit 10a".)

In subsidiary control circuit 10a shown in FIG. 2, the series circuit of a diode 104 and a resistor 103 is connected to the gate of subsidiary switching device 2 via a resistor 101. The emitter of a transistor 107 is connected to the connection point of resistors 101 and 103 and the collector of transistor 107 is connected to winding 6b. The series circuit of diode 104 and resistor 103 adjusts the charging speed of the gate (control terminal) input capacitance of subsidiary switching device 2 and controls the ON and OFF of transistor 107.

The series connection of a diode 106 and a resistor 105 is connected in parallel to winding 6b and the connection point of diode 106 and resistor 105 is connected to the base of transistor 107. This circuit configuration facilitates adjusting the charging speed of the gate input capacitance of subsidiary switching device 2 and controlling transistor 107 so as not to make the gate-source voltage of subsidiary switching device 2 negative. A resistor 102 is a discharging resistor, connected between winding 6b and the connection point of resistors 101 and 103, for preventing subsidiary switching device 2 from turning ON erroneously due to the unstable gate-source voltage of subsidiary switching device 2 caused when any voltage is not generated in winding 6b. Alternatively, resistor 102 may be connected in parallel between the gate and source of subsidiary switching device 2. In a further alternative arrangement, resistor 102 may be omitted if the resistance value of resistor 105 is small.

Now the operations of the electric power converter shown in FIG. 1 will be described below with reference to FIG. 3.

Figure 3:
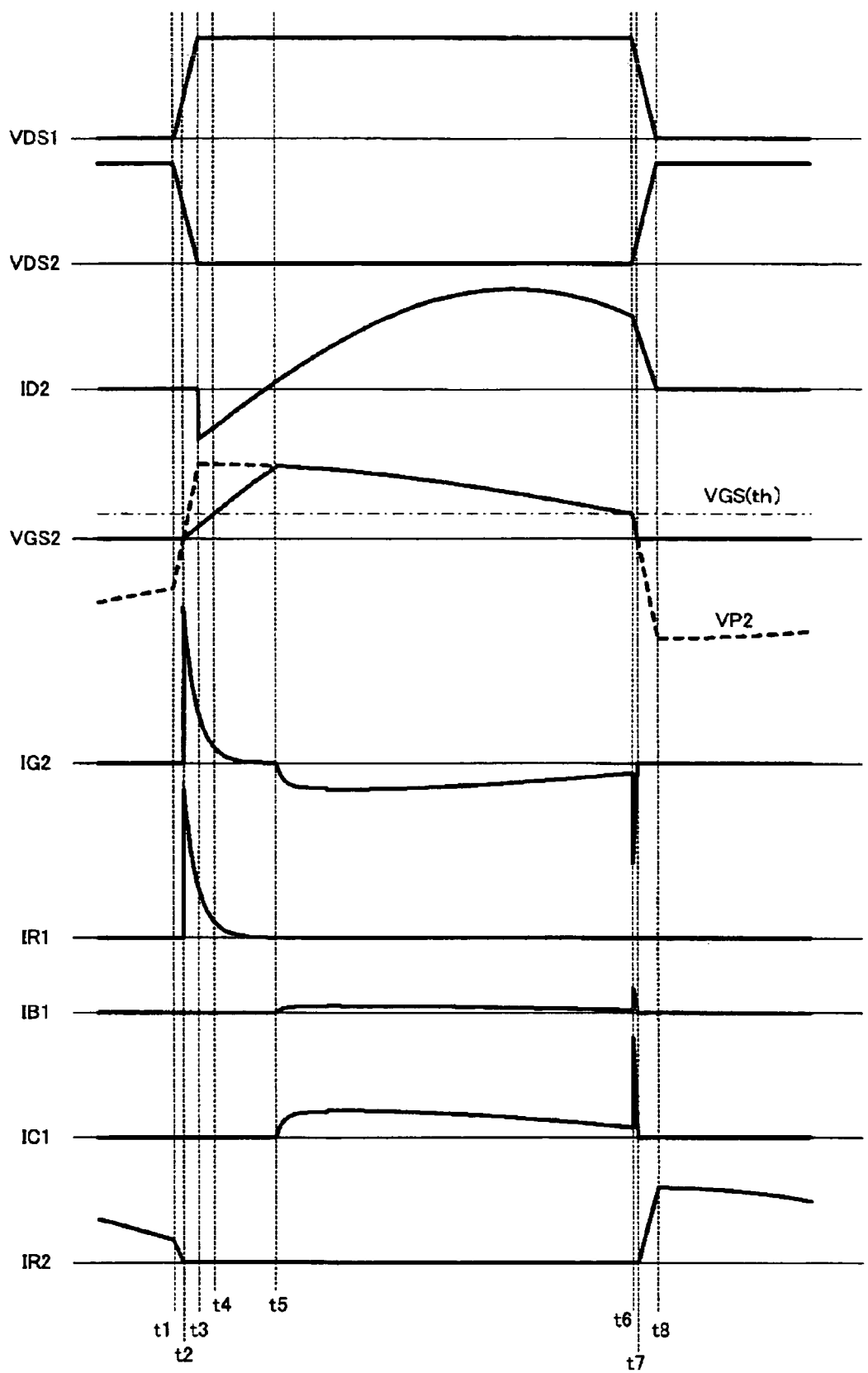
FIG. 3 is a wave chart describing the operations of the electric power converter according to the first embodiment shown in FIG. 1.

In FIG. 3, the drain-source voltage VDS1 of main switching device 1 in FIG. 1, the drain-source voltage VDS2, drain current ID2, gate-source voltage VGS2, and gate current IG2 of subsidiary switching device 2 in FIG. 1 are described. Also described in FIG. 3 are the voltage VP2 of winding 6b, the gate threshold voltage VGS(th) of subsidiary switching device 2, the current IR1 of resistor 103 in FIG. 2, the base current IB1 of transistor 107 in FIG. 2, the collector current IC1 of transistor 107, and the current IR2 of resistor 105. The operation of the electric power converter according to the first embodiment will be described below from the time t1 to the time t8 with reference to FIG. 3.

State 1: t1 to t2

As main switching device 1 turns OFF, the drain-source voltage VDS1 of main switching device 1 rises and the drain-source voltage VDS2 of subsidiary switching device 2 lowers. In association with the rise of the drain-source voltage VDS1, the voltage VP2 of winding 6b also rises.

State 2: t2 to t3

As the voltage VP2 of winding 6b shifts to positive, diode 104 becomes electrically conductive and the gate input capacitance of subsidiary switching device 2 is charged up with the voltage VP2 via diode 104, resistor 103 and resistor 101. The gate input capacitance is charged up with a primary delay with respect to the voltage of winding 6b at the time constant determined by the gate input capacitance value and the series resistance value of resistors 103 and 101. The time constant is set so that no large short circuit current may be caused by the simultaneous ON state of main and subsidiary switching devices 1 and 2.

State 3: t3 to t4

As the drain-source voltage VDS2 of subsidiary switching device 2 reaches zero, the body diode of subsidiary switching device 2 becomes electrically conductive and the drain current ID2 thereof flows with the negative polarity.

State 4: t4 to t5

As the gate-source voltage VGS2 of subsidiary switching device 2 exceeds the gate threshold voltage VGS(th), subsidiary switching device 2 turns ON at the zero voltage.

State 5: t5 to t6

As the gate-source voltage VGS2 of subsidiary switching device 2 becomes equal to the voltage VP2 of winding 6b, transistor 107 works in the active region so that the gate-source voltage VGS2 and the winding voltage VP2 may be almost equal to each other. In detail, when the winding voltage VP2 is higher than the gate-source voltage VGS2, diode 104 becomes electrically conductive and the voltage between the base and emitter of transistor 107 becomes almost zero, turning OFF transistor 107. When the winding voltage VP2 is lower than the gate-source voltage VGS2, diode 104 turns OFF and the voltage between the base and emitter of transistor 107 shifts to negative, turning ON transistor 107.

State 6: t6 to t7

As the gate-source voltage VGS2 of subsidiary switching device 2 falls below the gate threshold voltage VGS(th), subsidiary switching device 2 turns OFF, the drain-source voltage VDS2 of subsidiary switching device 2 rises and the drain-source voltage VDS1 of main switching device 1 lowers. In association with the lowering of the drain-source voltage VDS1, the voltage VP2 of winding 6b lowers rapidly. Consequently, the difference between the winding voltage VP2 and the gate-source voltage VGS2 of subsidiary switching device 2 becomes large rapidly. Due to the rapid voltage difference widening, the base current IB1 of transistor 107 increases rapidly and the collector current IC1 of transistor 107 also increases rapidly, discharging the electric charges stored in the gate input capacitance of subsidiary switching device 2 rapidly until the gate-source voltage VGS2 of subsidiary switching device 2 becomes zero.

State 7: t7 to t8

As the voltage VP2 of winding 6b shifts to negative, diode 106 becomes electrically conductive and the current IR2 of resistor 105 becomes equal to the value obtained by dividing the voltage VP2 by the resistance value of resistor 105. Since the voltage between the base and emitter of transistor 107 is almost zero and transistor 107 is OFF, the gate-source voltage VGS2 of subsidiary switching device 2 is kept at zero.

Subsequently, the states t1 through t7 are repeated.

Since the gate-source voltage VGS2 of subsidiary switching device 2 is zero as described above while the voltage VP2 of winding 6b is negative, the gate-source voltage VGS2 never exceeds the negative gate breakdown voltage. The current fed from winding 6b in this period of time is limited by the resistance value of resistor 105. Since the resistance value of resistor 105 is preferably from several kilohms to several tens of kilohms, low enough to make a current of several mA flow to the base of transistor 107, the losses caused are low. Consequently, the electric power converter according to the first embodiment causes low losses and exhibits a high conversion efficiency.

Figure 4:
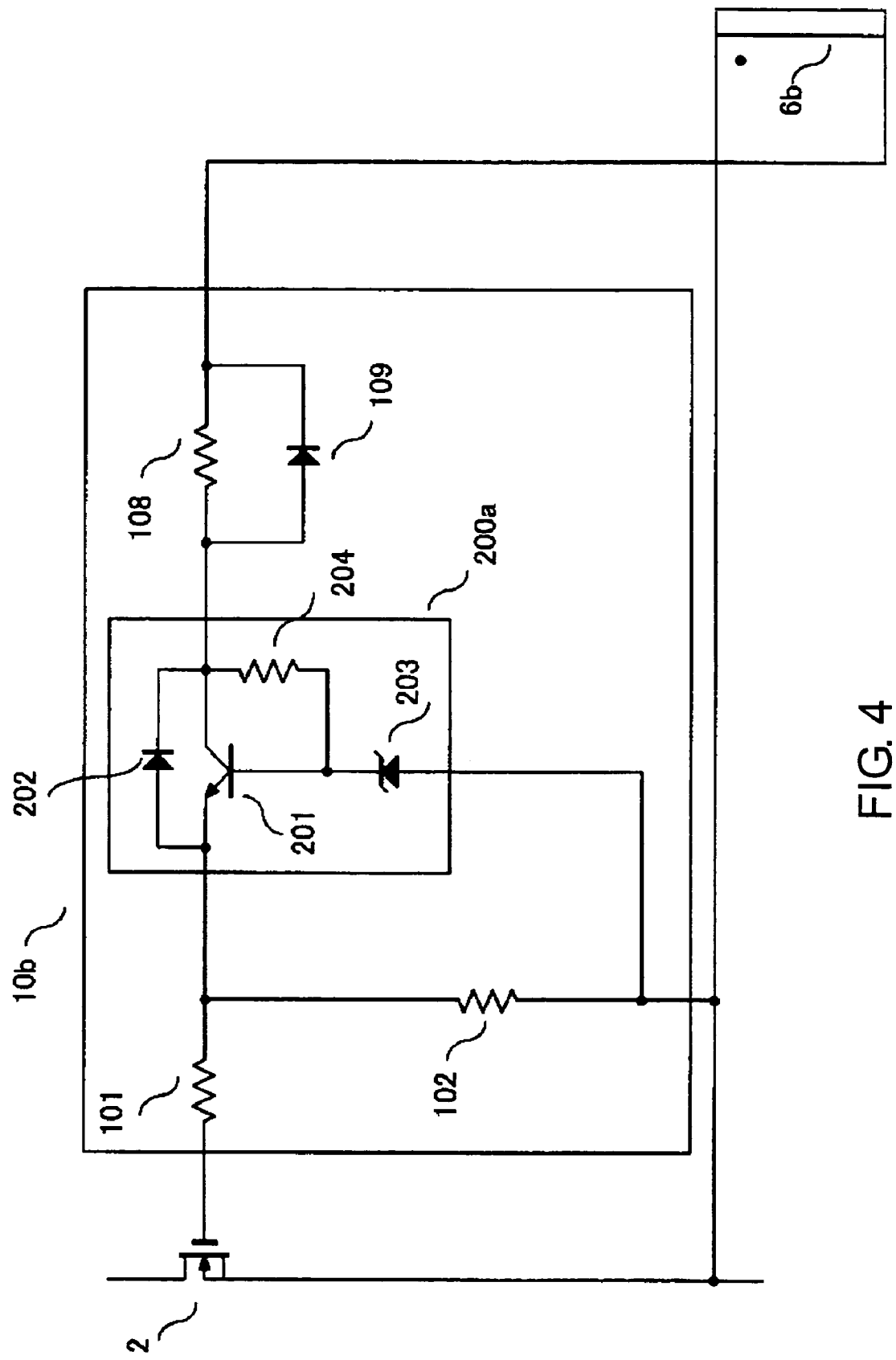
FIG. 4 is another typical example of the subsidiary control circuit in FIG. 1.

FIG. 4 shows another typical example 10b of subsidiary control circuit 10 in FIG. 1. (Hereinafter, typical example 10b of subsidiary control circuit 10 will be referred to simply as "subsidiary control circuit 10b".)

Referring now to FIG. 4, the parallel circuit of a resistor 108 and a diode 109 is connected to one end of winding 6b and a clamping circuit 200a is connected to the other end of the parallel circuit. The other end of clamping circuit 200a is connected to the gate of subsidiary switching device 2 via resistor 101.

Clamping circuit 200a has a configuration similar to that of a so-called series regulator. In clamping circuit 200a, the Zener voltage Vz of a Zener diode 203 is selected so that as the voltage of winding 6b exceeds the sum of the Zener voltage Vz and the voltage VBE between the base and emitter of a transistor 201, transistor 201 may work in the active region thereof, the gate-source voltage of subsidiary switching device 2 may be constant (Vz+VBE), and the gate-source voltage of subsidiary switching device 2 may not exceed the gate breakdown voltage thereof on the positive side.

Since transistor 201 works in the saturation region when the voltage of winding 6b is lower than (Vz+VBE), the gate-source voltage of subsidiary switching device 2 is almost equal to the voltage of winding 6b. A diode 202 prevents a reverse bias voltage from being applied between the collector and emitter of transistor 201.

Together with resistor 101, resistor 108 adjusts the charging speed of the gate input capacitance of subsidiary switching device 2. Together with resistor 101, diode 109 adjusts the discharging speed of the gate input capacitance of subsidiary switching device 2. Since resistor 102 works in the same manner as in FIG. 2, the duplicated descriptions thereof are omitted.

As described above, even if a positive voltage higher than the gate breakdown voltage of subsidiary switching device 2 is generated in winding 6b, the gate-source voltage of subsidiary switching device 2 will be clamped at (Vz+VBE). In this case, since the current fed from winding 6b is limited by a resistor 204 and since the resistance value of resistor 204 is from several kilohms to several tens of kilohms, low enough to feed a current of around several mA to the base of transistor 201, the losses caused are low. Consequently, the subsidiary control circuit according to the second embodiment causes low losses and exhibits a high conversion efficiency.

Figure 5:
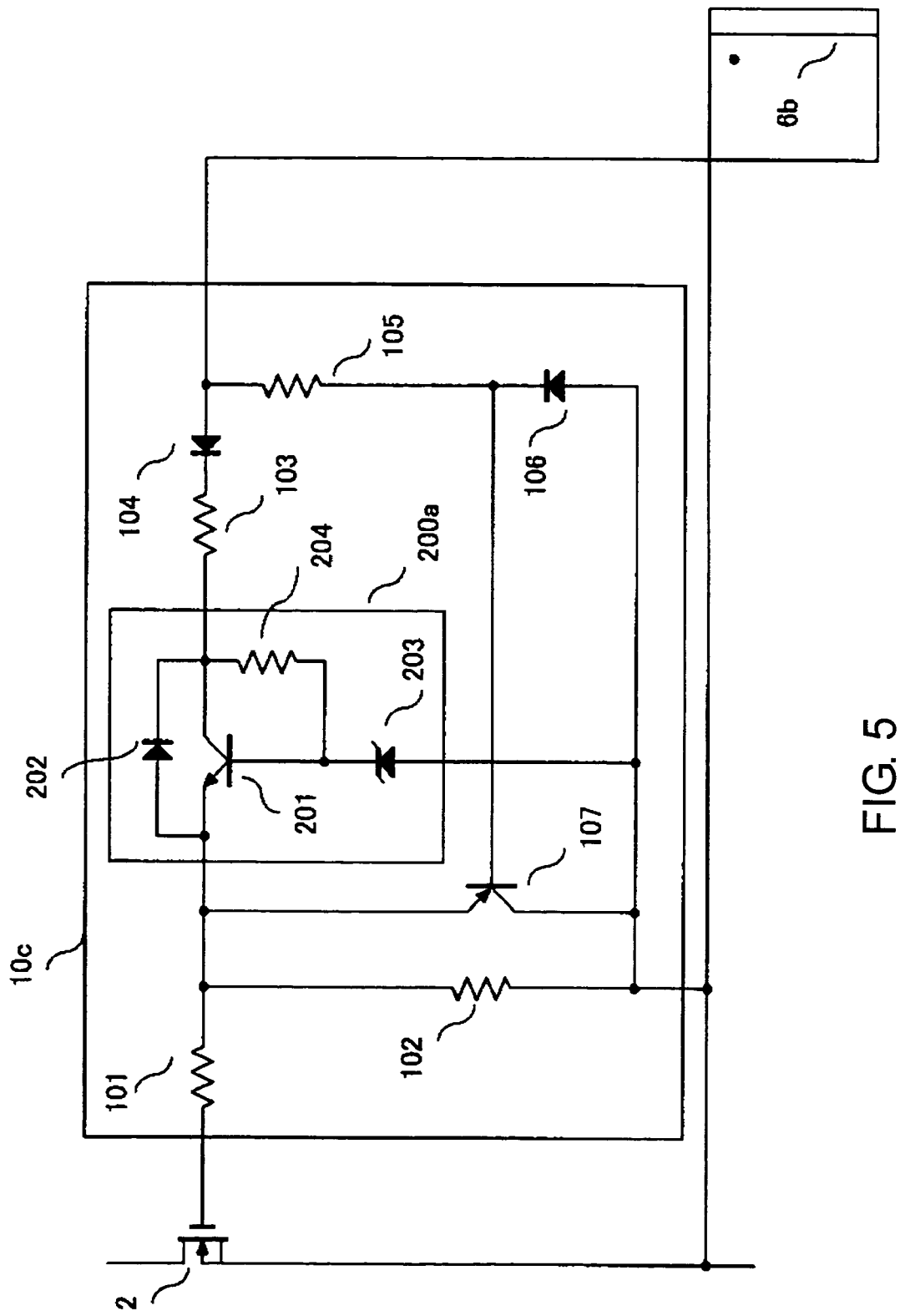
FIG. 5 is still another typical example of the subsidiary control circuit in FIG. 1.

FIG. 5 shows still another typical example 10c of subsidiary control circuit 10 in FIG. 1. (Hereinafter, typical example 10c of subsidiary control circuit 10 will be referred to simply as "subsidiary control circuit 10c".)

Referring now to FIG. 5, clamping circuit 200a is connected between resistor 103 and the emitter of transistor 107 of FIG. 2. Subsidiary control circuit 10c works in the same manner as subsidiary control circuit 10a in FIG. 2, when the voltage of winding 6b is negative. Subsidiary control circuit 10c works in the same manner as subsidiary control circuit 10b in FIG. 4, when the voltage of winding 6b is positive. Therefore, detailed descriptions of subsidiary control circuit 10c will be omitted.

In the circuit shown in FIG. 5, the gate-source voltage of subsidiary switching device 2 never exceeds the gate breakdown voltage thereof irrespective of the voltage of winding 6b and the losses caused thereby are low.

Consequently, the subsidiary control circuit according to the third embodiment causes low losses and exhibits a high conversion efficiency.

What is claimed is:

1. An electric power converter for use with a DC power supply having positive and negative terminals, comprising:
a series circuit, including a main switching device and a subsidiary switching device that are connected to one another at a connection point, the series circuit being connected between the positive and negative terminals of the DC power supply;
a capacitor;
a rectifying and smoothing circuit;
an insulating transformer, including a first winding on a primary side thereof, a second winding on a secondary side thereof, and third and forth windings on the primary side thereof, the first winding and the capacitor being included in another series circuit that is connected between the positive terminal of the DC power supply and the connection point of the main and subsidiary switching devices, and the second winding being connected to a load via the rectifying and smoothing circuit;
a main control circuit turning the main switching device ON and OFF; and a subsidiary control circuit turning the subsidiary switching device ON and OFF;

wherein the main and subsidiary control circuits turn the main and subsidiary switching devices ON and OFF alternately;

wherein the main control circuit turns the main switching device ON and OFF using a voltage supplied by the third winding for a signal voltage, to adjust the DC voltage fed to the load to a certain value;

wherein the main control circuit uses a voltage obtained by rectifying and smoothing a voltage generated in the third winding for a control power supply;

wherein the subsidiary control circuit turns the subsidiary switching device ON and OFF using a voltage generated in the fourth winding for a signal voltage;

wherein the subsidiary control circuit includes a further series circuit including a first diode and a first resistor, an additional series circuit including an additional diode and a second resistor, and a transistor; and wherein the transistor controls a gate voltage that is supplied to the subsidiary switching device based on signal voltages that are generated in the further and additional series circuits, the gate voltage supplied to the subsidiary switching device always being non-negative.

2. An electric power converter for use with a DC power supply having positive and negative terminals, comprising:

a series circuit, including a main switching device and a subsidiary switching device that are connected to one another at a connection point, the series circuit being connected between the positive and negative terminals of the DC power supply;

a capacitor;

a rectifying and smoothing circuit;

an insulating transformer, including a first winding on a primary side thereof, a second winding on a secondary side thereof, and third and forth windings on the primary side thereof, the first winding and the capacitor being included in another series circuit that is connected between the positive terminal of the DC power supply and the connection point of the main and subsidiary switching devices, and the second winding being connected to a load via the rectifying and smoothing circuit;

a main control circuit turning the main switching device ON and OFF; and a subsidiary control circuit turning the subsidiary switching device ON and OFF;

wherein the main and subsidiary control circuits turn the main and subsidiary switching devices ON and OFF alternately;

wherein the main control circuit turns the main switching device ON and OFF using a voltage supplied by the third winding for a signal voltage, to adjust the DC voltage fed to the load to a certain value;

wherein the main control circuit uses a voltage obtained by rectifying and smoothing a voltage generated in the third winding for a control power supply;

wherein the subsidiary control circuit turns the subsidiary switching device ON and OFF using a voltage generated in the fourth winding for a signal voltage;

wherein the subsidiary control circuit includes a transistor;

wherein the transistor is controlled to prevent a gate voltage supplied to the subsidiary switching device from exceeding the gate breakdown voltage of the subsidiary switching device; and wherein the subsidiary control circuit further includes a first diode that is connected to a first resistor in a first series circuit and a second diode that is connected to a second resistor in a second series circuit, both the first series circuit and the second series circuit being connected to the transistor.

3. An electric power converter for use with a DC power supply having positive and negative terminals, comprising:

a series circuit, including a main switching device and a subsidiary switching device that are connected to one another at a connection point, the series circuit being connected between the positive and negative terminals of the DC power supply;

a capacitor;

a rectifying and smoothing circuit;

an insulating transformer, including a first winding on a primary side thereof, a second winding on a secondary side thereof, and third and forth windings on the primary side thereof, the first winding and the capacitor being included in another series circuit that is connected between the positive terminal of the DC power supply and the connection point of the main and subsidiary switching devices, and the second winding being connected to a load via the rectifying and smoothing circuit;

a main control circuit turning the main switching device ON and OFF; and a subsidiary control circuit turning the subsidiary switching device ON and OFF;

wherein the main and subsidiary control circuits turn the main and subsidiary switching devices ON and OFF alternately;

wherein the main control circuit turns the main switching device ON and OFF using a voltage supplied by the third winding for a signal voltage, to adjust the DC voltage fed to the load to a certain value;

wherein the main control circuit uses a voltage obtained by rectifying and smoothing a voltage generated in the third winding for a control power supply;

wherein the subsidiary control circuit turns the subsidiary switching device ON and OFF using a voltage generated in the fourth winding for a signal voltage;

wherein the subsidiary control circuit includes a further series circuit including a first diode and a first resistor, an additional series circuit including a second diode and a second resistor, a first transistor, and a second transistor;

wherein the first transistor controls the control terminal voltage of the subsidiary switching device based on signal voltages generated in the further and additional series circuits; and wherein the second transistor is controlled based on the signal voltages generated in the further and additional series circuits, to prevent the control terminal voltage of the subsidiary switching device from exceeding a predetermined value.

* * * * *